United States Patent
Yasuda

(10) Patent No.: US 9,632,395 B2
(45) Date of Patent: Apr. 25, 2017

(54) METHOD AND APPARATUS FOR CONTROLLING INTERCHANGEABLE LENS SYSTEM CAMERA HAVING REDUCED DELAY TIME TO DETECT LENS AND ACCESSORY DEVICE INFORMATION

(71) Applicant: SAMSUNG ELECTRONICS CO., LTD., Suwon-si, Gyeonggi-do (KR)

(72) Inventor: Tomonaga Yasuda, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 10 days.

(21) Appl. No.: 14/471,579

(22) Filed: Aug. 28, 2014

(65) Prior Publication Data
US 2015/0070521 A1    Mar. 12, 2015

(30) Foreign Application Priority Data
Sep. 12, 2013    (KR) .......................... 10-2013-0109975

(51) Int. Cl.
*G03B 17/14*    (2006.01)
*G03B 17/56*    (2006.01)
(Continued)

(52) U.S. Cl.
CPC .......... *G03B 17/14* (2013.01); *G03B 17/565* (2013.01); *H04N 5/2254* (2013.01); *G03B 2206/00* (2013.01); *H04N 5/23209* (2013.01)

(58) Field of Classification Search
None
See application file for complete search history.

(56) References Cited

U.S. PATENT DOCUMENTS

| 5,434,637 A | 7/1995 | Ohta |
| 2005/0158044 A1* | 7/2005 | Ide .......................... G03B 17/14 396/71 |

(Continued)

FOREIGN PATENT DOCUMENTS

| JP | 2002-072328 A | 3/2002 |
| JP | 2006-171392 A | 6/2006 |

(Continued)

OTHER PUBLICATIONS

Extended European Search Report issued for EP 14183351.7 (Feb. 18, 2015).

*Primary Examiner* — Justin P Misleh
(74) *Attorney, Agent, or Firm* — Drinker Biddle & Reath LLP

(57) ABSTRACT

A method of controlling an accessory device which is connected with a body unit of an interchangeable lens system camera is described. The method includes: receiving identification information of a first device from the first device through a first communication path that passes through a digital signal processing unit of the accessory device; generating combination information by adding identification information of the accessory device to the identification information of the first device; transmitting the combination information to a second device through the first communication path; and when receiving a switching signal from the second device, switching the first communication path to a second communication path that does not pass through the digital signal processing unit of the accessory device.

11 Claims, 7 Drawing Sheets

(51) Int. Cl.
*H04N 5/225* (2006.01)
*H04N 5/232* (2006.01)

(56) References Cited

U.S. PATENT DOCUMENTS

| | | | | |
|---|---|---|---|---|
| 2005/0237417 | A1* | 10/2005 | Miyasaka | G02B 7/34 |
| | | | | 348/335 |
| 2008/0136941 | A1 | 6/2008 | Kato | |
| 2010/0091175 | A1* | 4/2010 | Shintani | G02B 7/365 |
| | | | | 348/345 |
| 2011/0103789 | A1 | 5/2011 | Honjo et al. | |
| 2011/0229114 | A1* | 9/2011 | Okada | G03B 17/14 |
| | | | | 396/71 |
| 2011/0229115 | A1* | 9/2011 | Okada | G03B 17/14 |
| | | | | 396/71 |
| 2012/0033955 | A1* | 2/2012 | Okada | G02B 7/14 |
| | | | | 396/71 |
| 2012/0163786 | A1 | 6/2012 | Murashima et al. | |
| 2012/0327267 | A1 | 12/2012 | Takahara | |
| 2013/0028590 | A1 | 1/2013 | Hasuda et al. | |
| 2015/0116592 | A1* | 4/2015 | Suzuki | G03B 17/14 |
| | | | | 348/375 |

FOREIGN PATENT DOCUMENTS

| | | | |
|---|---|---|---|
| JP | 2010-261984 | A | 11/2010 |
| JP | 2011-170153 | A | 9/2011 |
| JP | 2013-025235 | A | 2/2013 |
| JP | 2013-064948 | A | 4/2013 |

* cited by examiner

METHOD AND APPARATUS FOR CONTROLLING INTERCHANGEABLE LENS SYSTEM CAMERA HAVING REDUCED DELAY TIME TO DETECT LENS AND ACCESSORY DEVICE INFORMATION

RELATED APPLICATIONS

This application claims the priority benefit of Korean Patent Application No. 10-2013-0109975, filed on Sep. 12, 2013, in the Korean Intellectual Property Office, the disclosure of which is incorporated by reference herein in its entirety.

BACKGROUND

1. Field

Various embodiments of the present description relate to methods and apparatuses for controlling an interchangeable lens system camera, and more particularly, to methods and apparatuses for controlling an interchangeable lens system camera including accessory devices.

2. Related Art

An interchangeable lens system camera may use interchangeable lenses having various focal distances, brightness values, and resolution values. Therefore, photography may be performed according to the states or environments of a subject. Also, the interchangeable lens system camera may diversify a photography scene by using accessory devices, such as a device (e.g., tele-converter) configured to convert the focal distance between a camera body and a lens, and a device (e.g., extension tube) configured to facilitate macro photography, in addition to the interchangeable lenses.

With the widespread use of cameras, the reduction in size of cameras is desirable, and reduction in size of interchangeable lens cameras is also desirable. Unlike a film camera, since a digital camera may improve the image quality of a captured image by image processing, the digital camera may perform high-quality photography even when there are some defects in the optical characteristics obtained through an interchangeable lens.

Therefore, since the tolerance of the optical characteristics of a lens in an interchangeable lens camera may be increased, a degree of freedom in designing a lens is allowed. As a result, the lens may be reduced in size and in weight.

In this case, a body unit of a camera determines design information of the lens in order to perform appropriate image processing. The body unit may acquire the design information from the lens or obtain the design information in advance, and may perform correction in image processing based on the design information.

However, when an accessory device is used, the optical characteristics of light having passed through the lens may be changed. Therefore, in order to perform correction by an image processing device, it is necessary to detect which accessory device is mounted, in addition to the lens information.

However, in order to detect which accessory device is mounted, the body unit of the camera needs to communicate with the accessory device, and the accessory device needs to communicate with the lens. When the body unit and the lens unit communicate with each other, communication with the accessory device is necessary and a time lag occurs in the communication, which may cause a degradation in speed and performance of the camera. A method of detecting the presence of the accessory device by the lens may also have this problem.

In order to solve this problem, pins or physical components for generating a signal for determining the mounting state of an intermediate accessory device may be installed. However, in this case, signal pins or physical components by as many as the number of accessory devices are necessary. Also, since electrical equipment for performing communication for each pin or physical component is necessary, costs may be increased and a structure may be more complicated. Also, when a plurality of accessory devices are mounted, the above method may require a more complex design.

SUMMARY

Various embodiments of the present description include methods and apparatuses for controlling an interchangeable lens system camera. When a plurality of accessory devices are mounted between a camera unit and a lens unit in the interchangeable lens system camera, the apparatuses and methods detect identification information of the lens unit and identification information of each of the plurality of accessory devices through a first communication path to acquire optical characteristic information for image correction, and switch the first communication path to a second communication path to directly connect the body unit and the lens unit, thereby reducing a delay in communication between the lens unit and the body unit.

Additional embodiments will be set forth in part in the description which follows and, in part, will be apparent from the description, or may be learned by practice of the presented embodiments According to one or more embodiments, a method of controlling an accessory device which is connected with a body unit of an interchangeable lens system camera includes: receiving identification information of a first device from the first device through a first communication path that passes through a digital signal processing unit of the accessory device; generating combination information by adding identification information of the accessory device to the identification information of the first device; transmitting the combination information to a second device through the first communication path; and when receiving a switching signal from the second device, switching the first communication path to a second communication path that does not pass through the digital signal processing unit of the accessory device.

The first communication path may be a communication path through which the first device and the second device transmit the identification information of the first device and identification information of the accessory device to a second accessory device via the digital signal processing unit of the accessory device.

The interchangeable lens system camera may include at least a lens unit, the body unit, and the accessory device.

The second communication path may be a communication path through which the body unit and the lens unit directly communicate with each other without communication passing through the digital signal processing unit of the accessory device.

The first device may be another accessory device of the interchangeable lens system camera.

The identification information of the first device may include identification information of the lens unit and identification information of the other accessory device.

The combination information may include information about an order of combination of one or more accessory devices connected with the body unit. The one or more accessory devices may include the accessory device and the other accessory device.

The second device may be the body unit.

The method may further include directly controlling the lens unit through the second communication path without a delay due to the accessory device, where the controlling is performed by the body unit.

The body unit may use the combination information to acquire optical characteristic information for correction of an image based on light input through the lens unit and the accessory device.

The first device and the second device may be other accessory devices.

The method may further include: determining whether the second device has completed reception of the combination information through the first communication path; and when it is determined that the second device has completed the reception of the combination information, transmitting to the accessory device the switching signal for switching the first communication path to the second communication path.

According to one or more embodiments, an interchangeable lens system camera including a lens unit, a body unit, and an accessory device disposed between the lens unit and the body, the accessory device including: a digital signal processing unit configured to receive identification information of a first device from the first device through a first communication path that passes through a digital signal processing unit of the accessory device, generate combination information by adding information of the accessory device to the identification information of the first device, and transmit the combination information to a second device through the first communication path; and a switching unit configured to switch, when receiving a switching signal from the second device, the first communication path to a second communication path that does not pass through the digital signal processing unit of the accessory device.

The second communication path may be a communication path through which the body unit and the lens unit directly communicate with each other without passing through the digital signal processing unit of the accessory device.

The first device may be the lens unit or another accessory device.

The combination information may include information about the order of combination of one or more accessory devices.

The second device may be the body unit.

When the first communication path of the accessory device is switched to the second communication path, the body unit may directly control the lens unit through the second communication path without a delay due to the accessory device.

The second device may be another accessory device.

The second device may include a digital signal processing unit configured to transmit, when it is determined that the second device has completed reception of the combination information through the first communication path, the switching signal for switching the first communication path to the second communication path, to the accessory device.

According to one or more embodiments, an apparatus for controlling an accessory device which is connected with a body unit of an interchangeable lens system camera includes: a transmission control unit that controls transmission, when the accessory device receives identification information of a first device from the first device through a first communication path that passes through a digital signal processing unit of the accessory device, of combination information, generated by adding identification information of the accessory device to the identification information of the first device, to a second device through the first communication path; and a switching control unit that controls switching, when the accessory device receives a switching signal from the second device, of the first communication path to a second communication path that does not pass through the digital signal processing unit of the accessory device.

The second communication path may be a communication path through which the body unit and a lens unit of the interchangeable lens system camera directly communicate with each other without communication passing through the digital signal processing unit of the accessory device.

The interchangeable lens system camera may include at least a lens unit, the body unit, and the accessory device.

The combination information may include identification information about an order of combination of one or more accessory devices connected with the body unit, wherein the one or more accessory devices includes the accessory device.

The second device may be the body unit.

The switching control unit may switch the first communication path of the accessory device to the second communication path such that the body unit directly controls the lens unit through the second communication path without a delay due to the accessory device.

When it is determined that the second device has completed reception of the combination information through the first communication path, the switching control unit may control the digital signal processing unit to transmit the switching signal to the accessory device for switching the first communication path to the second communication path.

According to one or more embodiments, a non-transitory computer-readable recording medium stores a program which, when executed by a processor, performs the above-described method.

BRIEF DESCRIPTION OF THE DRAWINGS

These and/or other embodiments will become apparent and more readily appreciated from the following description of various embodiments, taken in conjunction with the accompanying drawings in which.

DETAILED DESCRIPTION

Figure 1:
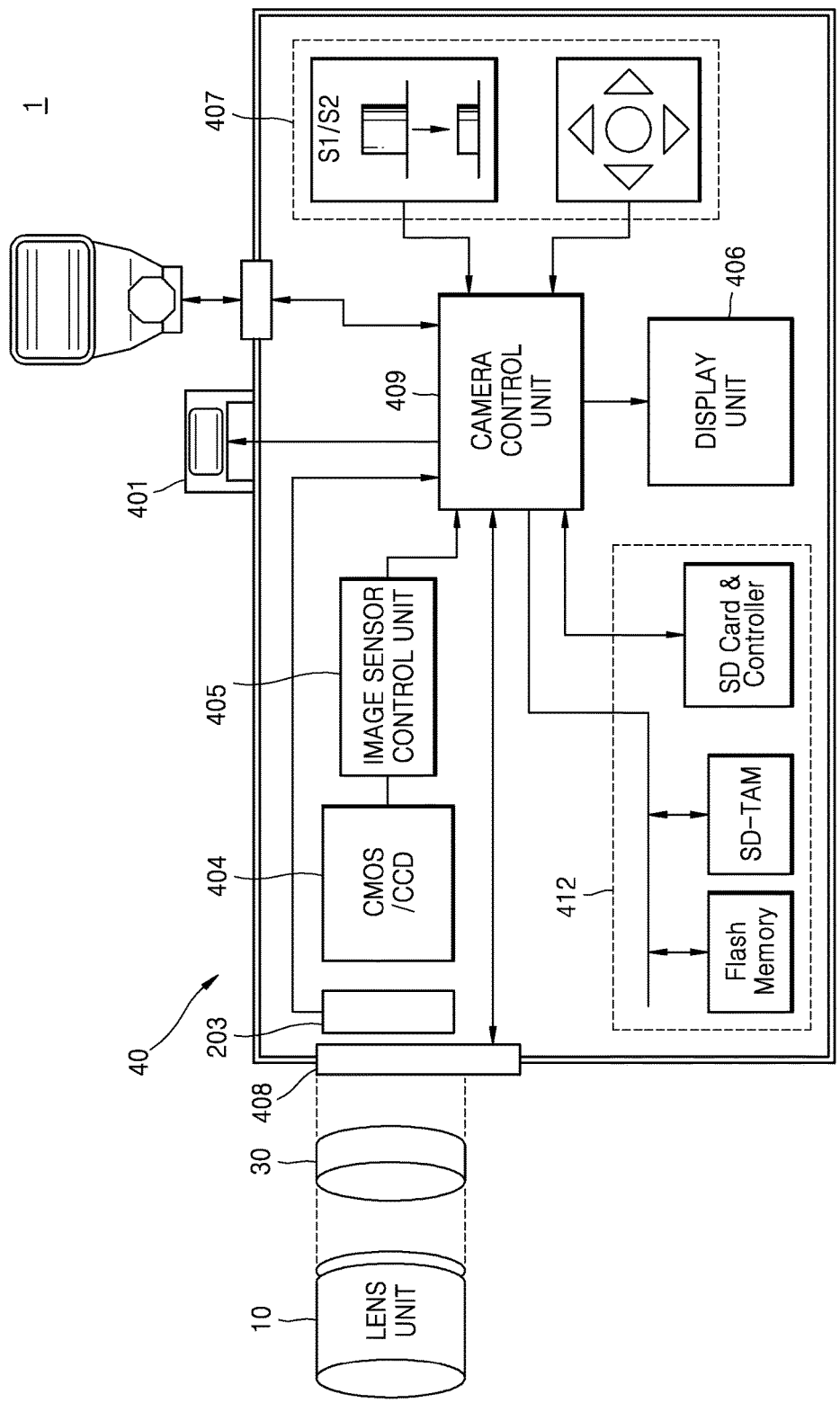
FIG. 1 is a block diagram illustrating an interchangeable lens system camera according to an embodiment.

Reference will now be made in detail to various embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items.

Hereinafter, methods of implementing and using embodiments of the present description will be described in detail. The terms "unit" and "module" used herein refer to units for processing at least one function or operation, and they may be implemented by hardware, software, or a combination thereof.

In this specification, various embodiments of the present description refer to particular characteristics, structures, and features that are described together with other embodiments. Therefore, the terms "embodiment" and "embodiments" appearing throughout the specification do not necessarily denote the same embodiments.

Hereinafter, various embodiments of the present description will be described with reference to the accompanying drawings.

FIG. 1 is a block diagram illustrating an interchangeable lens system camera 1 according to an embodiment.

Referring to FIG. 1, the interchangeable lens system camera 1 includes a lens unit 10, an accessory device 30, and a body unit 40.

Figure 2:
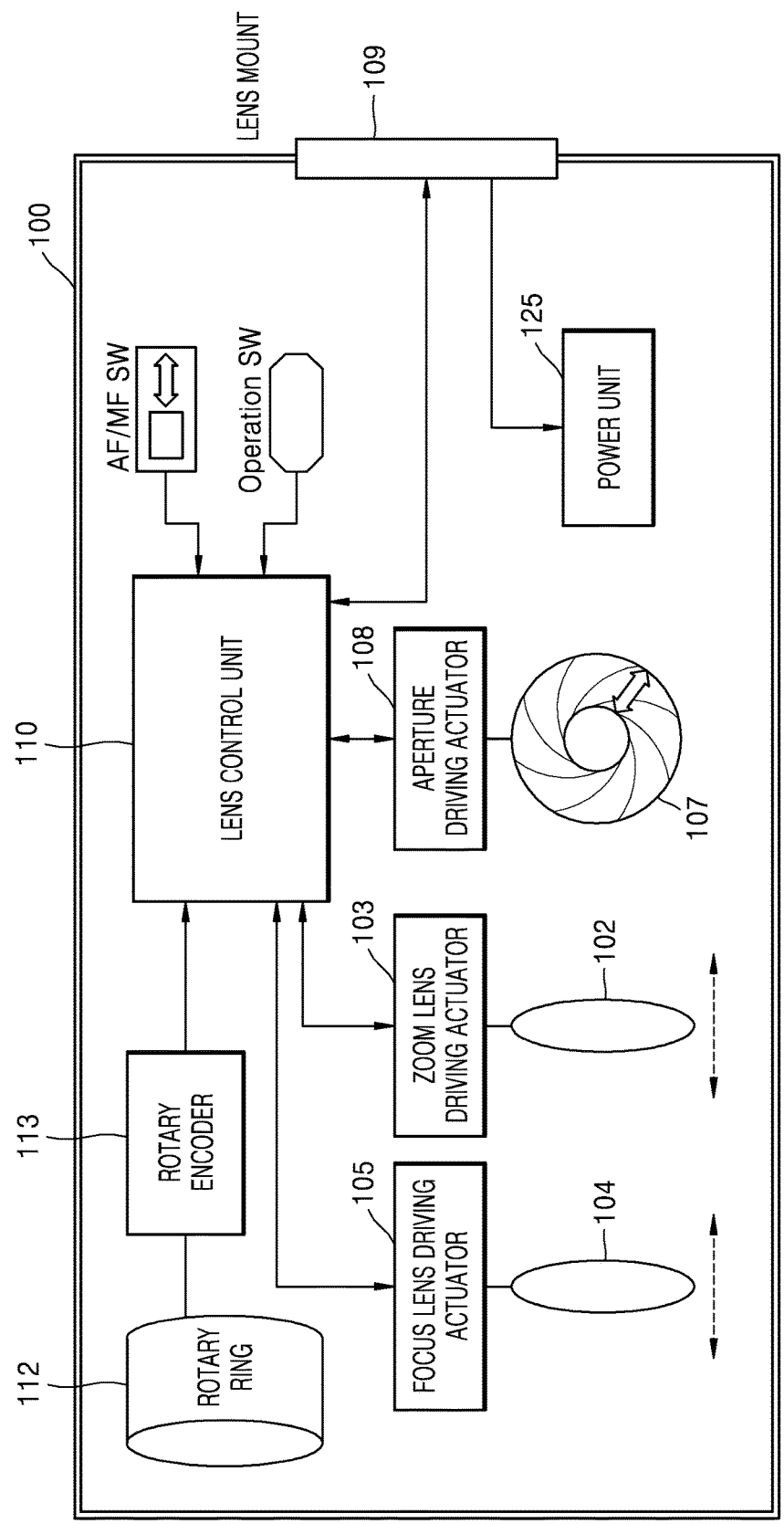
FIG. 2 is a block diagram illustrating a configuration of a lens unit according to an embodiment.
Figure 3A:
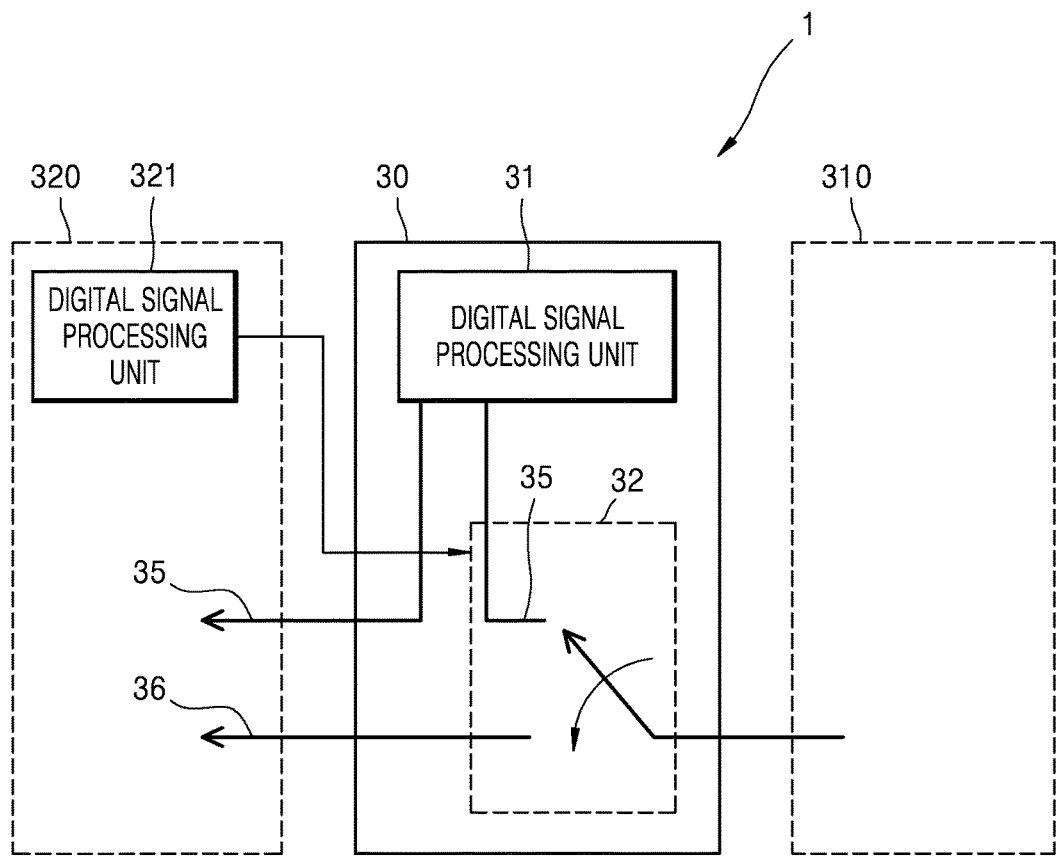
FIG. 3A is a block diagram illustrating an interchangeable lens system camera including a lens unit, a body unit, and an accessory device disposed between the lens unit and the body unit, according to an embodiment.

FIG. 1 illustrates a block diagram of the body unit 40 according to an embodiment. FIG. 2 illustrates a block diagram of a lens unit 100 (e.g., the lens unit 10) according to an embodiment. FIG. 3A illustrates a block diagram of the accessory device 30 according to an embodiment.

First, a configuration of the lens unit 100 will be described with reference to FIG. 2.

FIG. 2 is a schematic block diagram illustrating a configuration of the lens unit 100 according to an embodiment.

Referring to FIG. 2, the lens unit 100 may have a focus detecting function, and the body unit 40 may have a function for driving a focus lens 104 of the lens unit 100. When a manual focus control mode is used, a zoom lens 102 and the focus lens 104 of the lens unit 100 may be driven by a user's operation.

According to an embodiment, the lens unit 100 may include the zoom lens 102 for controlling a zoom, the focus lens 104 and a focus lens driving actuator 105 for changing a focus position, an aperture 107, a rotary encoder 113, an aperture driving actuator 108, a lens control unit 110, and a lens mount 109. Also, the zoom lens 102 and the focus lens 104 may be implemented by a lens group that is a combination of a plurality of lenses.

In an automatic focus control mode, the focus lens driving actuator 105 and the aperture driving actuator 108 are controlled by the lens control unit 110 to drive the focus lens 104 and the aperture 107, respectively. For example, the focus lens driving actuator 105 may drive the focus lens 104 to move in an optical axis direction. Also, a zoom lens driving actuator 103 may control a zoom by moving the zoom lens 102 in an optical axis direction.

On the other hand, the focus lens 104 may be controlled by a manual operation of the user, and a rotary encoder 113 may detect the position of the focus lens 104 according to a manual operation of the user. For example, the user may shift the position of the focus lens 104 by manually operating a rotary ring 112, and the rotary encoder 113 may calculate the position of the focus lens 104 by detecting a rotation state of the rotary ring 112. Since a configuration for shifting the position of the focus lens 104 by using the rotary ring 112 is well known to those of ordinary skill in the art, a detailed description thereof is omitted herein.

After calculating the position of the focus lens 104, the lens control unit 110 transmits the calculated position information of the focus lens 104 to the body unit 40. In this case, when the position of the focus lens 104 is changed, or when a request for the position information of the focus lens 104 is received from a camera control unit 409 (FIG. 1), the lens control unit 110 may transmit the calculated position information of the focus lens 104 to the body unit 40. Also, in a manual focus control mode, the lens control unit 110 may continuously calculate information about the rotation state of the lens unit 100 and transmit the calculated information to the body unit 40.

A power unit 125 may receive power from the body unit 40 and provide the power to the lens control unit 110 and the zoom lens driving, the focus lens driving, and the aperture driving actuators 103, 105, and 108.

Although it has been described above that the lens control unit 110 controls the lens unit 100, other embodiments may not be limited thereto. Those of ordinary skill in the art will understand that the camera control unit 409 may control the lens unit 100 or the lens control unit 110 and the camera control unit 409 may be integrated into one control unit.

The lens mount 109 has a lens-side communication pin, and is used in a transmission path of data or control signals by interlocking or engaging with a camera-side communication pin.

A configuration of the body unit 40 will now be described with reference to FIG. 1.

According to an embodiment, the body unit 40 may include a viewfinder 401, a shutter 203, an image sensor 404, an image sensor control unit 405, a display unit 406, one or more operation keys 407, the camera control unit 409, and a camera mount 408.

The viewfinder 401 may include a liquid crystal display unit (not illustrated) to display a captured image in real time.

The shutter 203 determines a time during which light is incident on the image sensor 404, e.g., an exposure time.

The image sensor 404 generates an image signal by capturing light that has passed through an imaging optical system of the lens unit 100. The image sensor 404 may include a plurality of photoelectric conversion units arranged in a matrix configuration, and one or more of a vertical transmission line or a horizontal transmission line configured to move a charge from the photoelectric conversion unit to read an image signal. The image sensor 404 may include a charged coupled device (CCD) sensor or a complementary metal oxide semiconductor (CMOS) sensor ("CMOS/CCD").

The image sensor control unit 405 generates a timing signal, and controls the image sensor 404 to capture an image in synchronization with the timing signal. Also, the image sensor control unit 405 sequentially reads a horizontal image signal when charge storage at each scanning line is completed, and the camera control unit 409 may use the read horizontal image signal to detect a focus.

The display unit 406 may display various images or information. The display unit 406 may include an organic light-emitting display (OLED) device. The display unit 406 may also include a general liquid crystal display (LCD) device. Also, a touch panel may be provided at a surface cover of the display unit 406 so that the user may input a touch position while viewing an image or information on the display unit 406.

The one or more operation keys 407 are configured to input various commands of the user to operate the interchangeable lens system camera 1. The operation keys 407 may include a shutter-release button, a main switch, a mode dial, a menu button, or the like.

The camera control unit 409 calculates a focus detection estimation value by detecting a focus of an image signal generated by the image sensor 404. Also, the camera control unit 409 stores a focus detection estimation value as lens position information at a focus detection time point according to a timing signal generated by the image sensor control unit 405, and calculates a focus position by using the focus detection estimation value stored as the lens position information received from the lens unit 100. The camera mount 408 may include a camera-side communication pin and transmit the focus position calculation result to the lens unit 100 through the camera-side communication pin.

According to an embodiment, the lens mount 109 of the lens unit 100 and the camera mount 408 of the body unit 40 may be communicatively coupled through an indirect communication path that passes through a digital signal processing unit of the accessory device 30. Therefore, the body unit 40 may receive identification information of the lens unit 100 and identification information of the accessory device 30 through the indirect communication path. In other embodiments, the indirect communication path of accessory devices (e.g., accessory devices 200 and 300, FIG. 5) may be switched to a direct communication path that does not pass through the digital signal processing unit, and in this case the body unit 40 may directly control the lens unit 100 through the direct communication path without a time lag.

An example of operation for directly controlling the body unit 40 and the lens unit 100 according to an embodiment will be described below.

When a subject is photographed, a main switch included in the operation keys 407 is operated to start an operation of the interchangeable lens system camera 1. The interchangeable lens system camera 1 performs a live-view display.

Light, which is reflected from the subject and passes through the lens unit 100, is input to the image sensor 404. In this case, the shutter 203 is in an open state. The image sensor 404 generates an image signal by converting the input light into an electrical signal. The image sensor 404 operates according to the timing signal generated by the image sensor control unit 405. The camera control unit 409 converts the generated image signal into displayable data, and outputs the data to the viewfinder 401 or the display unit 406. This operation is a live-view display, and images displayed by the live-view display may be continuously updated, e.g., displayed as a moving image. During the live-view display, manual focus control may be performed by a user operation, and the user may perform manual focus control by moving the focus lens 104 by operating the rotary ring 112.

After the live-view display is performed, when the interchangeable lens system camera 1 is in the automatic focus control mode, an auto-focusing (AF) operation is started when a shutter-release button of the operation keys 407 is half-pressed. The image sensor 404 performs an AF operation by using the generated image signal. In a contrast AF mode, a focus position is calculated from the focus detection estimation value affecting a contrast value, and the lens unit 100 is driven based on the focus position calculation result. For example, the camera control unit 409 calculates a focus detection estimation value, calculates information for control of the focus lens 104 based on the focus detection estimation value, and transmits the information to the lens control unit 110 through the lens mount 109 and the camera-side communication pin provided at the camera mount 408.

The lens control unit 110 performs an AF operation by driving the focus lens 104 in an optical axis direction by controlling the focus lens driving actuator 105 based on the received information. Herein, since the position of the focus lens 104 is monitored by using the rotary encoder 113, it may reach a desired position through feedback control. Also, the lens control unit 110 may track the accurate position of the focus lens 104 by accumulatively storing the position and the amount of driving of the focus lens 104.

When the zoom lens 102 is zoomed by a user operation, the rotary encoder 113 may detect the position of the zoom lens 102 based on the rotation state of a zoom ring, and the lens control unit 110 may perform an AF operation again by changing the AF control parameters of the focus lens 104.

When a subject image is focused through this operation and the shutter-release button is full-pressed, then the interchangeable lens system camera 1 performs exposure to capture the image. In this case, the camera control unit 409 completely closes the shutter 203 and transmits light measurement information, which has been acquired, as aperture control information to the lens control unit 110. The lens control unit 110 controls the aperture driving actuator 108 based on the aperture control information and adjusts the aperture 107 to an appropriate aperture value. The camera control unit 409 controls the shutter 203 based on the light measurement information and opens the shutter 203 for an appropriate exposure time to capture the image of the subject.

The captured image is image-signal-processed and compressed, and the result is stored in a memory card 412. Also, according to an embodiment, in the image signal processing and compressing operation, the camera control unit 409 may improve an image quality by correcting the captured image based on the lens identification information and the accessory device identification information.

Simultaneously, the captured image is output to the viewfinder 401 and the display unit 406 that displays a subject image. This image is referred to as a quick view or an after view. By this process, a series of photographing operations are completed.

The captured image may be modified based on the accessory devices connected to the interchangeable lens system camera 1.

Herein, according to an embodiment, the accessory device 30 includes a tele-converter configured to adjust a focal distance between the body unit and the lens unit of a camera, or an extension tube configured to facilitate macro photography. However, other embodiments of the present description are not limited thereto. Those of ordinary skill in the art will readily understand that the accessory device 30 is an accessory device that may be connected between the lens unit 100 and the body unit 40 to facilitate a photographing operation of the interchangeable lens system camera 1.

A detailed method for controlling the accessory device 30 according to an embodiment will be described with reference to FIGS. 3A and 4.

FIG. 3A is a block diagram illustrating an interchangeable lens system camera 1 including a lens unit 100, a body unit 40, and an accessory device 30 disposed between the lens unit 100 and the body unit 40, according to an embodiment.

Referring to FIG. 3A, the interchangeable lens system camera 1 may include the accessory device 30, a first device 310, and a second device 320. The accessory device 30 may include a digital signal processing unit 31 and a switching unit 32.

According to an embodiment, the first device 310 may be the lens unit 100 or another accessory device. According to an embodiment, the second device 320 may be the body unit 40 or another accessory device.

The digital signal processing unit 31 of the accessory device 30 receives identification information of the first device 310 from the first device 310 through a first communication path 35.

For example, when the first device 310 is the lens unit 100, the identification information received from the first device 310 may include identification information of the lens unit 100.

The digital signal processing unit 31 generates combination information by adding identification information of the accessory device 30 to the identification information of the first device 310, and transmits the combination information to the second device 320 through the first communication path 35.

The first communication path 35 is a communication path through which the first device 310 and the second device 320 transmit the identification information of the first device 310 and identification information of the accessory device 30 to another accessory device via the digital signal processing unit 31 of the accessory device 30.

According to an embodiment, a digital signal processing unit 321 of the second device 320 receives the combination information through the first communication path 35. Thereafter, the digital signal processing unit 321 determines whether reception of the combination information has been completed. When it is determined that the reception of the combination information has been completed, the digital signal processing unit 321 transmits a switching signal for switching the first communication path 35 to a second communication path 36 (e.g., a direct communication path), to the accessory device 30.

According to an embodiment, the switching unit 32 of the accessory device 30 receives the switching signal from the second device 320 and switches the first communication path 35 to the second communication path 36 through which the lens unit 100 (e.g., the device 310) and the second device 320 directly communicate with each other.

The second communication path 36 is a communication path through which the lens unit 100 and the body unit 40 directly communicate with each other without communication passing through the digital signal processing unit 31 of the accessory device 30. Therefore, when the communication path of the accessory device 30 is switched to the second communication path 36, the second device 320 may be directly connected to the lens unit 100.

For example, when the second device 320 is the body unit 40, the body unit 40 may receive the combination information from the accessory device 30 and receive a switching signal for switching the communication path of the accessory device 30. Therefore, when the communication path of the accessory device 30 is switched to the second communication path 36, the body unit 40 may directly control the lens unit 100 without communication passing through the digital signal processing unit 321 of the accessory device 30.

The combination information may include the identification information of the lens unit 100 and identification information of one or more accessory devices. Also, the combination information may include information about a sequence or order of combination of a plurality of accessory devices.

According to an embodiment, when the first device 310 is another accessory device, the first device 310 may include a digital signal processing unit (not illustrated) and a switching unit (not illustrated) to transmit the identification information. Therefore, when completing the reception of the identification information, the accessory device 30 may transmit a switching signal to the first device 310 to switch the communication path, which passes through the digital signal processing unit, to the communication path through which the lens unit 100 and the accessory device 30 directly communicate with each other without communication passing through the digital signal processing unit of the first device 310. Also, the identification information transmitted from the first device 310 to the accessory device 30 may include identification information of one or more accessory devices in addition to the identification information of the lens unit 100.

Also, when the second device 320 is another accessory device, the second device 320 may add the identification information of the second device 320 to the combination information received from the accessory device 30 and transmit the resulting information to a next device through another first communication path that passes through the digital signal processing unit 321. Also, the second device 320 may receive a switching signal from the next device and switch the second communication path that does not pass through the digital signal processing unit 321. As described above, even when a plurality of accessory devices are combined, since the interchangeable lens system camera 1 according to an embodiment sequentially adds identification information of the accessory devices and transmits the identification information to the body unit 40, the body unit 40 may detect the order of combination of the accessory devices. Therefore, since the interchangeable lens system camera 1 may detect the accessory devices through which the light has passed through the lens unit 100 and have changed the optical characteristics of the light, the interchangeable lens system camera 1 may correct the captured input image more accurately.

Also, as described above, the body unit 40 may receive the combination information including the identification information of the lens unit, the identification information of one or more accessory devices, and the information about the order of combination of the accessory devices. After receiving the combination information, the body unit 40 may be connected to the second communication path 36 through which the lens unit 100 and the body unit 40 directly communicate with each other. Therefore, even when a large number of accessory devices are connected, the body unit 40 may directly control the lens unit 100 without a delay due to the accessory devices.

As described above, in the interchangeable lens system camera 1 according to an embodiment, the accessory device 30 that receives combination information (or the body unit 40) controls the switching of the communication path of the transmitting device that transmits the combination information. If the combination information transmitting device controls the switching of its own communication path, the communication path may be switched to the communication path, which directly connects a lens unit and a body unit, without detecting whether the receiving device has received the information.

When the communication path is switched, a digital signal processing unit of the transmitting device no longer participates in communication. Therefore, even when the receiving device has failed to complete the reception of the combination information, or even when there is an error in the transmitted combination information, there may be no way to receive the combination information of the transmitting device any more. Therefore, the receiving device may stably receive the combination information by transmitting a switching signal for switching the communication path, to the transmitting device, after determining whether the reception of the combination information has been completed.

On the other hand, according to an embodiment, the above operation may be performed by an interchangeable lens system camera control apparatus.

Figure 3B:
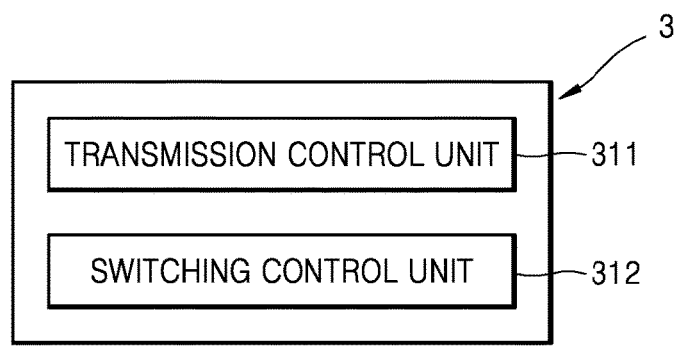
FIG. 3B illustrates an interchangeable lens system camera control apparatus according to an embodiment.

FIG. 3B illustrates an interchangeable lens system camera control apparatus 3 according to an embodiment.

Referring to FIG. 3B, the interchangeable lens system camera control apparatus 3 may include a transmission control unit 311 and a switching control unit 312.

The transmission control unit 311 of the interchangeable lens system camera control apparatus 3 may control transmission of combination information. When an accessory device receives identification information of a first device from the first device (e.g., through a first communication path that passes through a digital signal processing unit of the accessory device), the accessory device generates the combination information by adding identification information of the accessory device to the identification information of the first device. The accessory device then transmits the combination information to a second device through the first communication path.

When it is determined that the second device has completed reception of the combination information, the switching control unit 312 may control a digital signal processing unit of the second device to transmit a switching signal to the accessory device for switching the first communication path to a second communication path.

Therefore, when the accessory device receives the switching signal from the second device, the switching control unit 312 may control switching from the first communication path to the second communication path that does not pass through the digital signal processing unit of the accessory device.

The interchangeable lens system camera control apparatus 3 has been described as an independent component. However, the interchangeable lens system camera control apparatus 3 may also be understood as a module that is included in the lens unit 100 (see FIG. 1), the accessory device 30 (see FIG. 1), or the body unit 40 (see FIG. 1) to perform the above operation. Therefore, the transmission control unit 311 and the switching control unit 312 of the interchangeable lens system camera control apparatus 3 illustrated in FIG. 3B may correspond to one or more processors. A processor may be implemented by a plurality of logic gates, or may be implemented by a combination of a general-purpose microprocessor and a memory storing a program that may be executed in the general-purpose microprocessor. Also, those of ordinary skill in the art will understand that the processor may also be implemented by other types of hardware.

Figure 4:
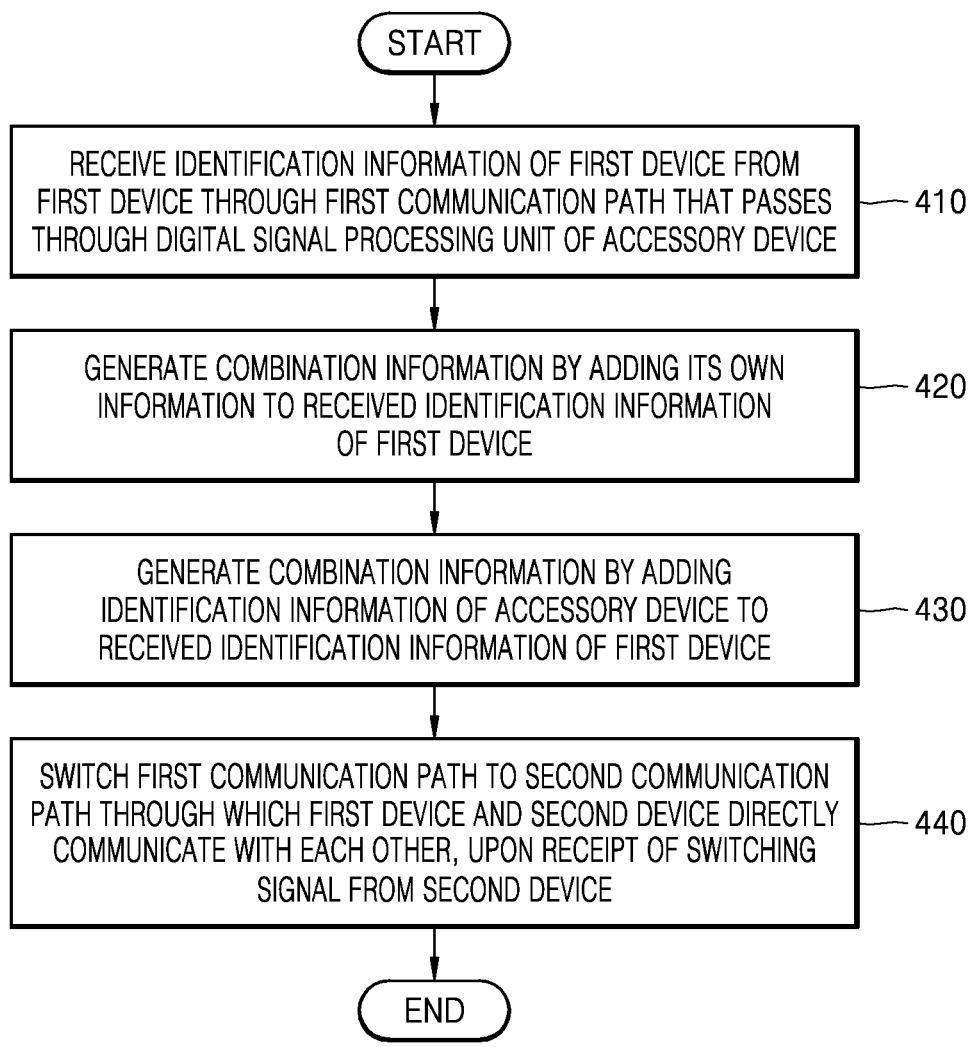
FIG. 4 is a flowchart illustrating a method of controlling an interchangeable lens system camera that includes a lens unit, a body unit, and an accessory device disposed between the lens unit and the body unit, according to an embodiment.

FIG. 4 is a flowchart illustrating a method of controlling the interchangeable lens system camera 1 including the lens unit 100, the body unit 40, and the accessory device 30 disposed between the lens unit 100 and the body unit 40, according to an embodiment.

Referring to FIG. 4, the method of controlling the interchangeable lens system camera 1 includes operations that may be sequentially performed in the interchangeable lens system camera 1 illustrated in FIG. 3A. Therefore, descriptions of the interchangeable lens system camera 1 illustrated in FIG. 3A above may also be applied to the method illustrated in FIG. 4.

In operation 410, the digital signal processing unit 31 of the accessory device 30 receives identification information of the first device 310 from the first device 310 through the first communication path 35. The first communication path 35 may be a communication path through which the first device 310 and the second device 320 transmit the identification information of the first device 310 and identification information of the accessory device 30 to another accessory device via the digital signal processing unit 31 of the accessory device 30.

In operation 420, the digital signal processing unit 31 generates combination information by adding the identification information of the accessory device 30 to the identification information of the first device 310. For example, identification information of one or more accessory devices and information about the order of combination of the accessory devices may be added to the identification information of the lens unit 100 to generate the combination information.

In operation 430, the digital signal processing unit 31 transmits the combination information to the second device 320 through the first communication path 35.

In operation 440, the switching unit 32 receives a switching signal from the second device 320 and switches the first communication path 35 to the second communication path 36 through which the lens unit 100 and the second device 320 (e.g., the body unit 40) directly communicate with each other. The second communication path 36 may be a communication path through which the lens unit 100 and the body unit 40 directly communicate with each other without communication passing through the digital signal processing unit 31 of the accessory device 30. Therefore, when the communication path of the accessory device 30 is switched to the second communication path 36, the second device 320 may be directly connected from the lens unit 100.

Figure 5:
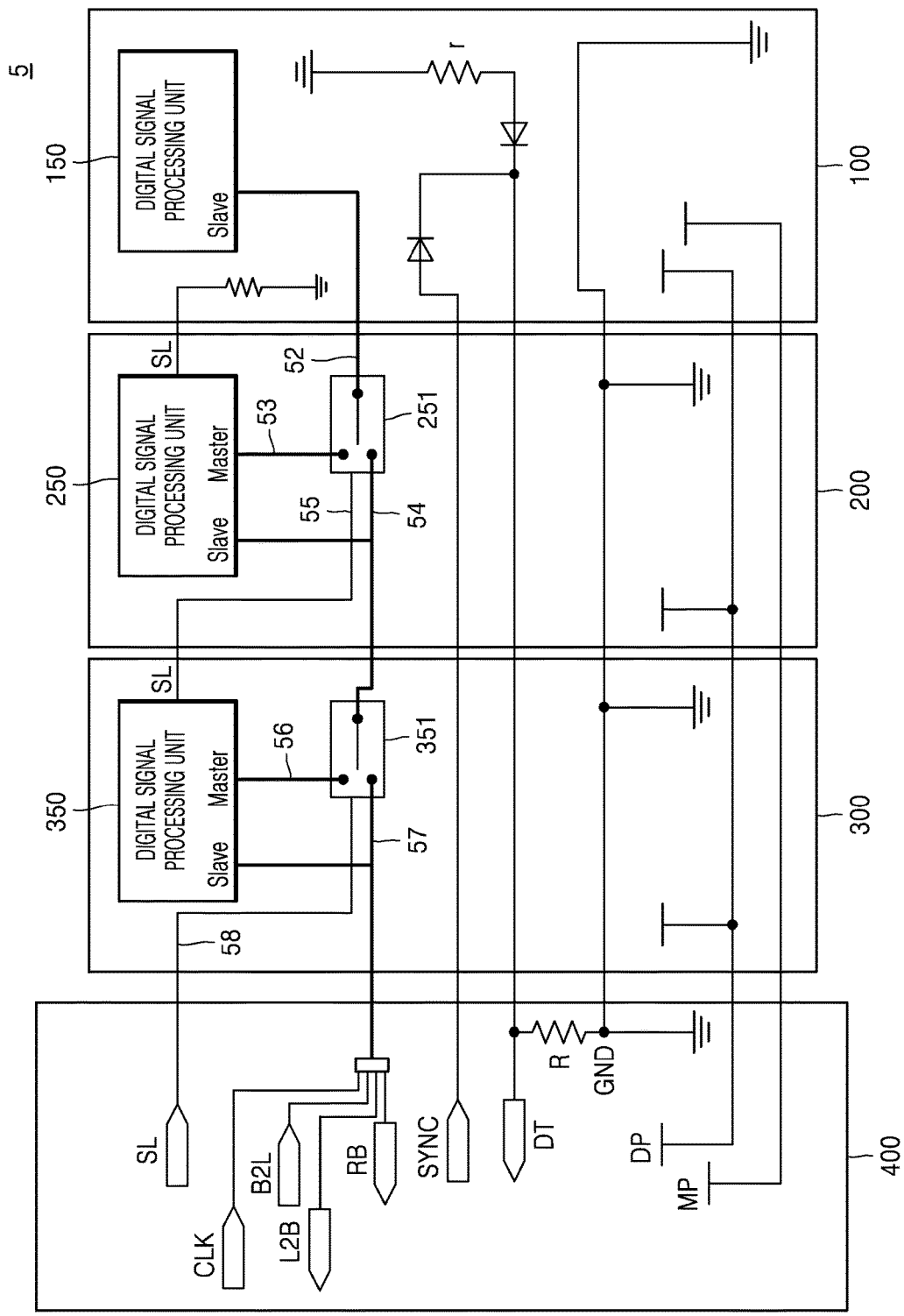
FIG. 5 is a block diagram illustrating a generalized schematic for a process of an interchangeable lens system camera for detecting a lens unit and accessory devices, according to an embodiment.

FIG. 5 is a block diagram illustrating a generalized schematic for a process of an interchangeable lens system camera 5 for detecting a lens unit 100 and accessory devices, for example, first and second accessory devices 200 and 300, according to an embodiment.

Referring to FIG. 5, the interchangeable lens system camera 5 may include the lens unit 100, the first accessory device 200, the second accessory device 300, and a body unit 400. Only components necessary to describe the present embodiment are illustrated in FIG. 5. However, those of ordinary skill in the art will understand that the interchangeable lens system camera 5 may further include other (e.g., general-purpose) components in addition to the components illustrated in FIG. 5. Also, for the convenience of description of the present embodiment, the interchangeable lens system camera 5 is described as including two accessory devices, for example, the first and second accessory devices 200 and 300. However, those of ordinary skill in the art will understand that the interchangeable lens system camera 5 may include one or more accessory devices.

In an embodiment, the interchangeable lens system camera 5 may include a plurality of signal lines, and each signal line of the plurality of signal lines may perform the function described below. Also, each signal line of the plurality of signal lines may be implemented in the form of an interface connecting the lens unit 100, the first accessory device 200, the second accessory device 300, and the body unit 400, in which input/output terminals are connected through communication pins.

Switching Line (SL) denotes an output terminal for a switching signal for switching communication lines of switching units 251 or 351.

SPI Clock Signal Provided by Body (CLK) denotes an output terminal for providing a synchronization clock in a Serial Peripheral Interface (SPI) Bus communication scheme.

Data Line for Body to Lens (B2L) and Data Line for Lens to Body (L2B) respectively denote data input/output terminals between the body unit 400 and the lens unit 100, and RB denotes an input terminal of a signal indicating that initialization has been completed.

SYNC and DT are respectively an output terminal and an input terminal in a signal line for detecting whether the lens unit 140 is connected. For example, if the lens unit 100 is connected when a signal output from SYNC changes from Low to High, since a signal input to DT also changes from Low to High, the body unit 400 may detect that the lens unit 100 is connected.

Ground (GND) denotes a ground signal line.

Motor Power (MP) and Digital Power (DP) denote output terminals for supplying power to the lens unit 100, the first accessory device 200, and the second accessory device 300.

The process of the interchangeable lens system camera 5 for detecting the lens unit 100, the first accessory device 200, and the second accessory device 300, according to an embodiment, will be described below. The first accessory device 200 may be an extension tube, and the second accessory device 300 may be a tele-converter; however, other embodiments of the present description are not limited thereto.

First, when power is supplied to the body unit 400, the body unit 400 maintains the input terminal RB in a pull-down state. Thereafter, the body unit 400 sets a signal output through SYNC, to a High state. According to an embodiment, when the lens unit 100 is mounted regardless of the presence/absence of the first and second accessory devices 200 and 300, since a signal output from SYNC is input to the body unit 400 through DT, a signal input to DT also changes into a High state. Therefore, it may be determined whether the lens unit 100 has been mounted.

When it is determined that the lens unit 100 has been mounted, the body unit 400 enables DP to supply power to the first and second accessory devices 200 and 300 and the lens unit 100.

Thereafter, the first and second accessory devices 200 and 300 and the lens unit 100 perform initialization.

While the first accessory device 200 performs initialization, the switching unit 251 sets a line 52 and a line 53 to be connected.

While the second accessory device 300 performs initialization, the switching unit 351 sets a line 54 and a line 56 to be connected.

Also, while performing initialization, the first accessory device 200 and the second accessory device 300 set an RB signal of slave communication to be low. Thereafter, the body unit 400 may enable MP to supply power for an actuator to the lens unit 100 (e.g., actuators 103, 105, or 108). Also, the lens unit 100 may receive the power and initialize the actuator.

After completion of the initialization, the lens unit 100, via a digital signal processing unit 150, changes RB into a High state and notifies, to the first accessory device 200 connected to the lens unit 100, that the initialization of the lens unit 100 has been completed.

Since the line 52 and the line 53 are connected to the switching unit 251 of the first accessory device 200 immediately after the initialization, a digital signal processing unit 250 may receive the RB signal from the digital signal processing unit 150 and detect that the RB of the lens unit 100 is in a High state. The digital signal processing unit 250 may acquire the identification information of the lens unit 100 by transmitting a test unit communication command to the lens unit 100.

When completing the acquisition of the identification information of the lens unit 100, the digital signal processing unit 250 of the first accessory device 200 changes the SL of a lens unit side into a High state. Herein, a signal output from the SL terminal is used to switch the communication path when another accessory device is connected to the lens unit side. In FIG. 5, since the lens unit 100 is connected to the first accessory device 200, the lens unit 100 does not perform a particular operation even when receiving an SL signal from the first accessory device 200.

Thereafter, the first accessory device 200 changes the RB to High through a slave communication pin, and notifies, to the second accessory device 300 connected to the body unit 400, that the initialization of the first accessory device 200 has been completed.

Since the line 54 and the line 56 are connected to the switching unit 351 of the second accessory device 300 immediately after the initialization, a digital signal processing unit 350 may detect that the RB of the second accessory device 200 is in a High state. The digital signal processing unit 350 may acquire the identification information of the first accessory device 200 and the identification information of the lens unit 100 by transmitting a test unit communication command to the digital signal processing unit 250 of the first accessory device 200. When completing the acquisition of the identification information of the first accessory device 200 and the identification information of the lens unit 100, the digital signal processing unit 350 of the second accessory device 300 changes an SL 55 of a first accessory device side into a High state. Therefore, by being notified of the High state of the SL 55 from the second accessory device 300, the switching unit 251 of the first accessory device 200 switches the line 52 and the line 54 into a connection state.

Thereafter, the digital signal processing unit 350 of the second accessory device 300 changes the RB of the slave communication pin to High and notifies, to the body unit 400, that the initialization of the second accessory device 300 has been completed.

The body unit 400 may acquire the identification information of the first accessory device 200, the identification information of the second accessory device 300, and the identification information of the lens unit 100 by transmitting a test unit communication command to the digital signal processing unit 350 of the second accessory device 300. When completing the acquisition of the identification information of the first accessory device 200, the identification information of the second accessory device 300, and the identification information of the lens unit 100, the body unit 400 changes an SL 58 of a second accessory device side to High. Therefore, by being notified of the High state of the SL 58 from the body unit 400, the switching unit 351 of the second accessory device 300 switches the line 54 and the line 57 into a connection state.

Therefore, when the line 52, the line 54, and the line 57 are connected, the lens unit 100 and the body unit 400 may be directly connected to each other.

As described above, by acquiring the information of the lens unit 100 and the information of the first and second accessory devices 200 and 300, the body unit 400 may determine which type of accessory device and lens unit are connected and in which order. Also, since the body unit 400 may directly communicate with the lens unit 100, a degradation in speed or performance may be reduced or prevented.

Figure 6A:
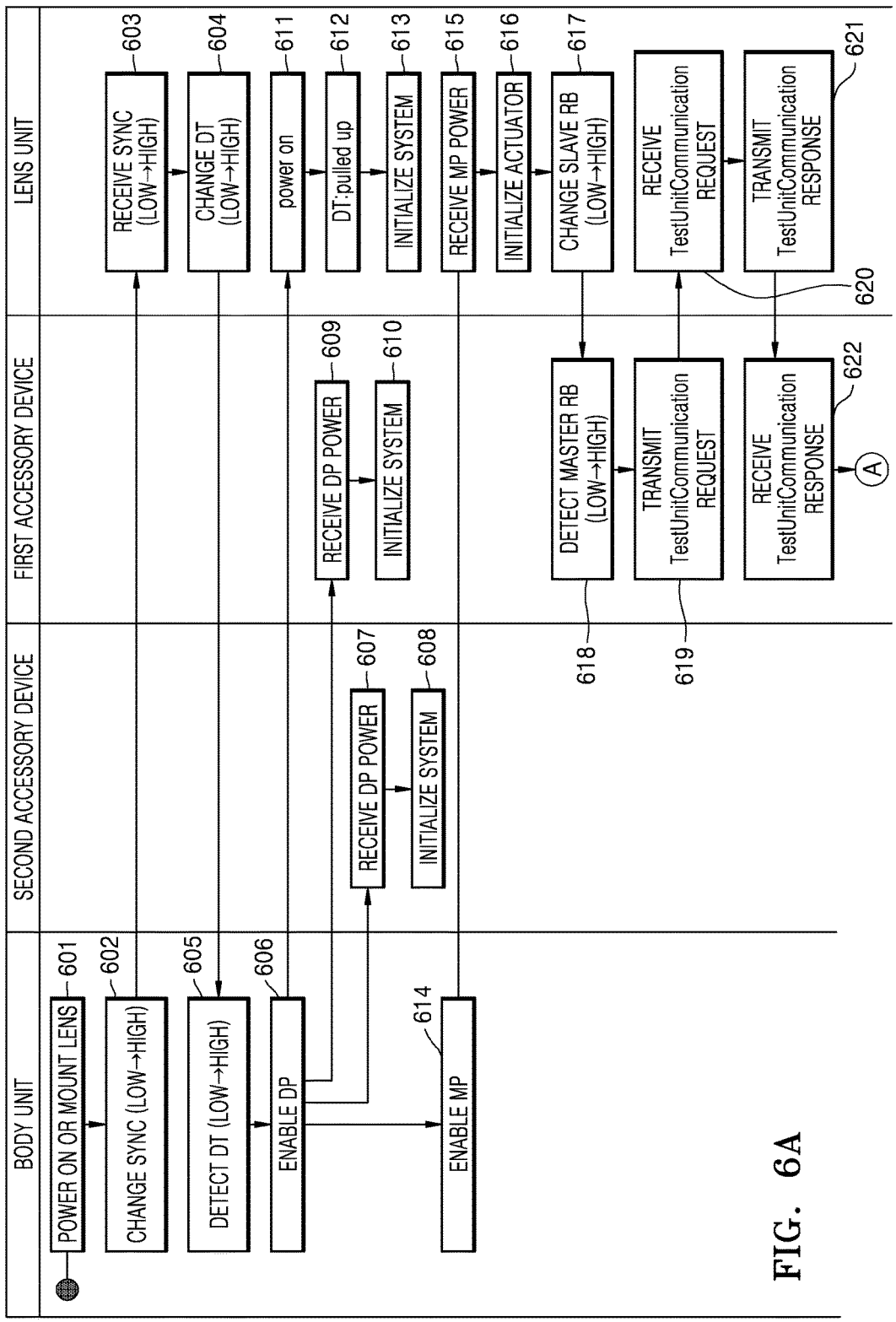
FIG. 6A and FIG. 6B are flowcharts of a process of an interchangeable lens system camera for detecting a lens unit, a first accessory device, and a second accessory device, according to an embodiment.
Figure 6B:
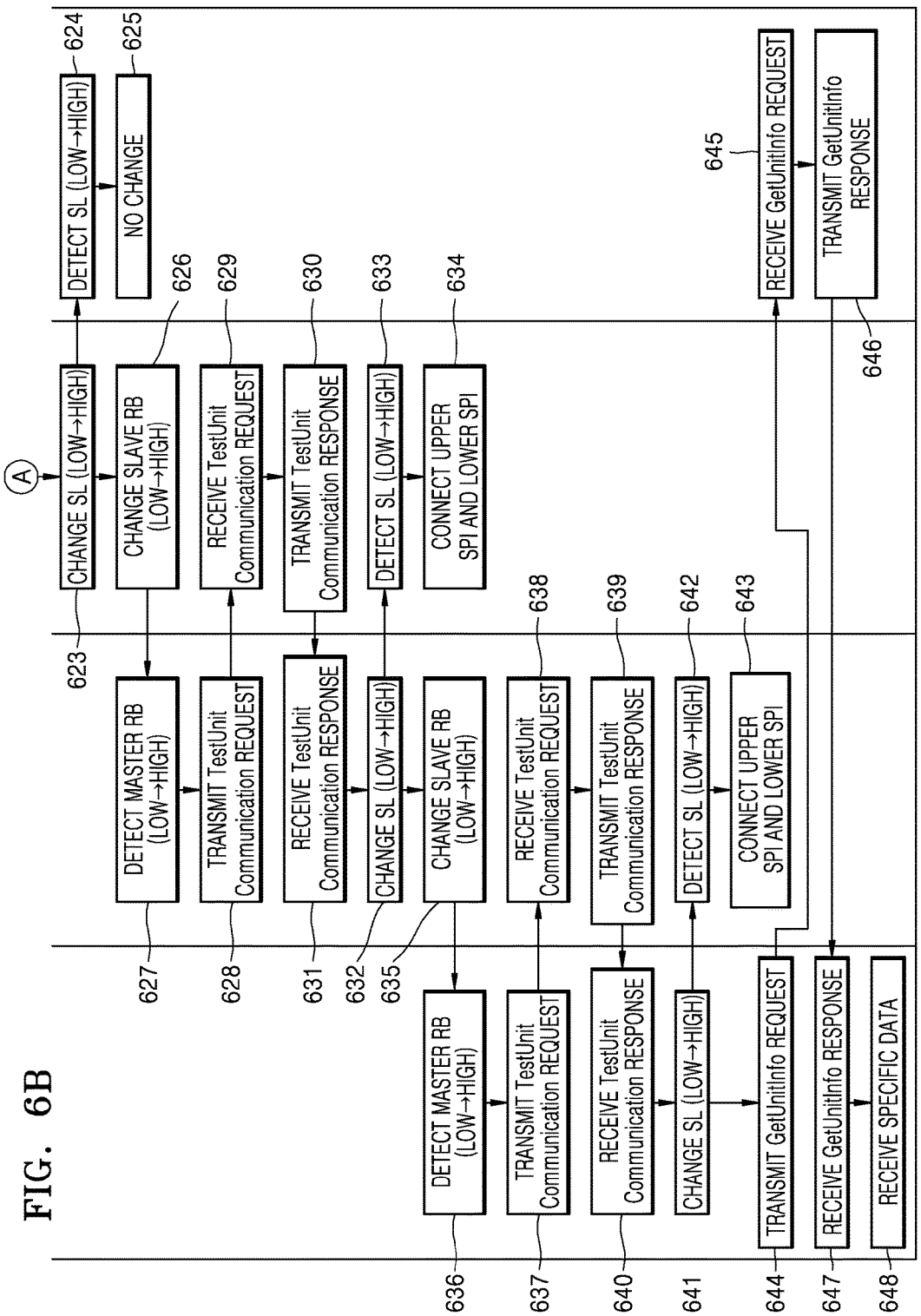

FIG. 6A and FIG. 6B are flowcharts of a process of an interchangeable lens system camera 5 for detecting a lens unit 100, a first accessory device 200, and a second accessory device 300, according to an embodiment.

FIG. 6A and FIG. 6B illustrate operations that may be sequentially performed in the interchangeable lens system camera 5 illustrated in FIG. 5. The above descriptions of the interchangeable lens system camera 5 illustrated in FIG. 5 may also be applied to the method illustrated in FIGS. 6A and 6B.

In operation 601, when power is supplied to the body unit 400, or when the lens unit 100 is mounted, one or more of the lens unit 100, the first accessory device 200, or the second accessory device 300 are detected.

In operation 602, the body unit 400 changes a SYNC signal from Low to High and transmits the changed SYNC signal to the lens unit 100. Therefore, when receiving the changed SYNC signal from the body unit 400 in operation 603, the lens unit 100 automatically transmits a signal obtained by changing DT to High to the body unit 400 in operation 604.

In operation 605, when detecting that the received DT signal has changed from Low to High, the body unit 400 determines that the lens unit 100 has been mounted.

In operation 606, when it is determined that the lens unit 100 has been mounted, the body unit 400 enables the DP to supply power to the first and second accessory devices 200 and 300 and the lens unit 100.

When the first and second accessory devices 200 and 300 receive the DP power in operations 607 and 609, the first and second accessory devices 200 and 300 perform initialization in operations 608 and 610, respectively. According to an embodiment, when the first accessory device 200 performs initialization, the switching unit 251 may set the line 52 and the line 53 to be connected. Also, when the second accessory device 300 performs initialization, the switching unit 351 may set the line 54 and the line 56 to be connected.

When receiving the DP power, the lens unit 100 is powered on in operation 611, automatically pulls up the DT signal in operation 612, and performs initialization in operation 613.

In operation 614, the body unit 400 enables the MP to supply power (e.g., for an actuator) to the lens unit 100. The lens unit 100 receives the power in operation 615 and initializes the actuator in operation 616.

After completion of the initialization, in operation 617, the lens unit 100 changes the slave RB into a High state and notifies, to the first accessory device 200 connected to the lens unit 100, that the initialization of the lens unit 100 has been completed.

In operation 618, the digital signal processing unit 250 of the first accessory device 200 detects that the master RB of the lens unit 100 is in a High state. Herein, since the line 52 and the line 53 are connected to the switch unit 251, the digital signal processing unit 250 may detect a slave RB signal of the lens unit 100.

In operations 619, 620, 621, and 622, the digital signal processing unit 250 of the first accessory device 200 may acquire the identification information of the lens unit 100 by transmitting (619) a test unit communication request to the lens unit 100.

When receiving (622) a Test Unit Communication response from the lens unit 100, the digital signal processing unit 250 of the first accessory device 200 changes the SL of the lens unit side into a High state (operation 623). Herein, a signal output from the SL terminal is used to switch the communication path when another accessory device is connected to the lens unit side. Although the lens unit 100 receives an SL signal from the first accessory device 200 in operation 624, the lens unit 100 does not perform a particular operation in operation 625 in response to the SL signal.

In operation 626, the first accessory device 200 changes the RB to High through the slave communication pin, and transmits the changed RB to the second accessory device 300 connected to the body unit 400. That is, the first accessory device 200 notifies, to the second accessory device 300, that the initialization of the first accessory device 200 has been completed.

In operation 627, since the line 54 and the line 56 are connected to the switching unit 351 of the second accessory device 300, the digital signal processing unit 350 may detect that the master RB of the digital signal processing unit 250 is changed into a High state.

When detecting that the master RB is changed to a High state, in operations 628, 629, 630, and 631, the digital signal processing unit 350 of the second accessory device 300 may acquire the identification information of the first accessory device 200 and the identification information of the lens unit 100 by transmitting (628) a Test Unit Communication signal to the digital signal processing unit 250 of the first accessory device 200 and receiving (631) a response signal from the digital signal processing unit 250.

In operation 632, when completing the acquisition of the identification information of the first accessory device 200 and the identification information of the lens unit 100, the digital signal processing unit 350 of the second accessory device 300 changes the SL 55 of the first accessory device side to a High state.

By being notified of the High state of the SL 55 from the second accessory device 300 in operation 633, the switching unit 251 of the first accessory device 200 switches the line 52 (e.g., an upper SPI bus) and the line 54 (e.g., a lower SPI bus) into a connection state in operation 634.

In operation 635, the digital signal processing unit 350 of the second accessory device 300 changes the slave RB to High and notifies, to the body unit 400, that the initialization of the second accessory device 300 has been completed. In operation 636, the body unit 400 detects that the master RB is changed to High.

Then, in operations 637, 638, 639, and 640, the body unit 400 may acquire the identification information of the first accessory device 200, the identification information of the second accessory device 300, and the identification information of the lens unit 100 by transmitting (637) a test unit communication request to the digital signal processing unit 350 of the second accessory device 300 and receiving (640) a response signal from the digital signal processing unit 350.

In operation 641, when completing the acquisition of the identification information of the first accessory device 200, the identification information of the second accessory device 300, and the identification information of the lens unit 100, the body unit 400 changes the SL 58 of the second accessory device side to High.

By being notified of the High state of the SL 58 from the body unit 400 in operation 642, the switching unit 351 of the second accessory device 300 switches the line 54 (e.g., an upper SPI bus) and the line 57 (e.g., a lower SPI bus) to a connection state in operation 643. Therefore, when the lower SPI buses (the line 52, the line 54, and the line 57) are connected, the lens unit 100 and the body unit 400 may directly communicate with each other.

In operations 644, 645, 646, 647, and 648, the body unit 400 receives (648) particular data by transmitting (644) a GetUnitInfo signal to the lens unit 100 and receiving (647) a response signal from the lens unit 100.

As described above, according to the one or more of the above embodiments, by acquiring the information of the lens unit 100 and the information of the first and second accessory devices 200 and 300, the body unit 400 may determine which type of accessory device and lens are connected and in which order. Also, since the body unit 400 may directly communicate with the lens unit 100, a degradation in speed or performance may be reduced or prevented.

All references, including publications, patent applications, and patents, cited herein are hereby incorporated by reference to the same extent as if each reference were individually and specifically indicated to be incorporated by reference and were set forth in its entirety herein.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A method of controlling one accessory device of a plurality of accessory devices connected with a body unit of an interchangeable lens system camera, wherein the interchangeable lens system camera comprises at least a lens unit, the body unit, and the one accessory device, the method comprising:

receiving identification information of another accessory device of the plurality of accessory devices from the another accessory device through a first communication path that passes through a digital signal processing unit of the one accessory device, wherein the identification information includes information regarding a type of lens of the lens unit and identification information of the another accessory device;

generating combination information by adding identification information of the one accessory device to the identification information of the another accessory device, wherein the combination information includes information regarding order of combination of the plurality of accessory devices connected with the body unit, the plurality of accessory devices comprising the one accessory device and the another accessory device;

transmitting the combination information to the body unit through the first communication path; and when receiving a switching signal from the body unit, switching the first communication path to a second communication path that does not pass through the digital signal processing unit of the one accessory device.

2. The method of claim 1, wherein the first communication path is a communication path through which the identification information of the another accessory device and the identification information of the one accessory device is communicated to the body unit via the digital signal processing unit of the accessory device.

3. The method of claim 1, wherein the second communication path is a communication path through which the body unit and the lens unit directly communicate with each other without communication passing through the digital signal processing unit of the one accessory device.

4. The method of claim 1, further comprising directly controlling the lens unit through the second communication path without a delay due to the one accessory device, where the controlling is performed by the body unit.

5. The method of claim 1, wherein the body unit uses the combination information to acquire optical characteristic information for correction of an image based on light input through the lens unit and the one accessory device.

6. The method of claim 1, further comprising:

determining whether the body unit has completed reception of the combination information through the first communication path; and when it is determined that the body unit has completed the reception of the combination information, transmitting to the one accessory device the switching signal for switching the first communication path to the second communication path.

7. An apparatus for controlling one accessory device of a plurality of accessory devices connected with a body unit of an interchangeable lens system camera, wherein the interchangeable lens system camera comprises at least a lens unit, the body unit, and the plurality of accessory devices, the apparatus comprising:

a transmission control unit that controls transmission, when the one accessory device receives identification information of another accessory device of the plurality of accessory devices from the another accessory device through a first communication path that passes through a digital signal processing unit of the one accessory device, of combination information, generated by adding identification information of the one accessory device to the identification information of the another accessory device, to the body unit through the first communication path; and a switching control unit that controls switching, when the one accessory device receives a switching signal from the body unit, of the first communication path to a second communication path that does not pass through the digital signal processing unit of the one accessory device, wherein the identification information of the another accessory device includes information regarding a type of lens of the lens unit and the identification information of the another accessory device, and wherein the combination information includes information regarding order of combination of the plurality of accessory devices connected with the body unit, the plurality of accessory devices comprising the one accessory device and the another device.

8. The apparatus of claim 7, wherein the second communication path is a communication path through which the body unit and a lens unit of the interchangeable lens system camera directly communicate with each other without communication passing through the digital signal processing unit of the one accessory device.

9. The apparatus of claim 7, wherein the switching control unit switches the first communication path of the one accessory device to the second communication path such that the body unit directly controls the lens unit through the second communication path without a delay due to the one accessory device.

10. The apparatus of claim 7, wherein when it is determined that the body unit has completed reception of the combination information through the first communication path, the switching control unit controls the digital signal processing unit to transmit the switching signal to the one accessory device for switching the first communication path to the second communication path.

11. A non-transitory computer-readable recording medium that stores a program which, when executed by a processor, performs the method of claim 1.

* * * * *